Jan. 24, 1961  O. J. HOLMES  2,968,966
INTERMITTENT MOTION DEVICE FOR PROJECTORS
Filed June 24, 1958  3 Sheets-Sheet 1

INVENTOR.
Oscar J. Holmes
By: Olson & Trexler
attys.

Jan. 24, 1961 O. J. HOLMES 2,968,966
INTERMITTENT MOTION DEVICE FOR PROJECTORS
Filed June 24, 1958 3 Sheets-Sheet 2
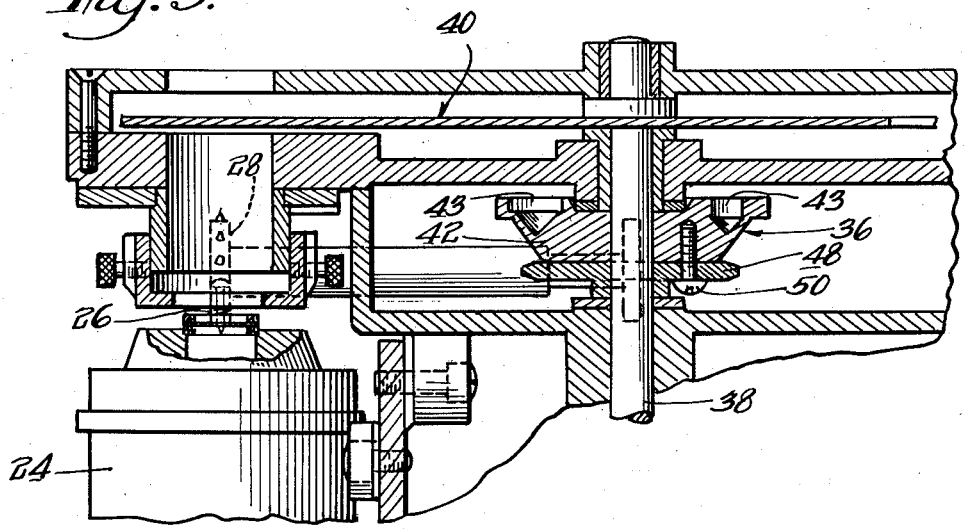
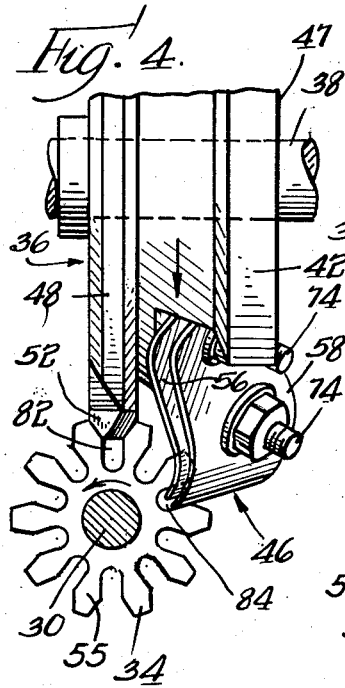
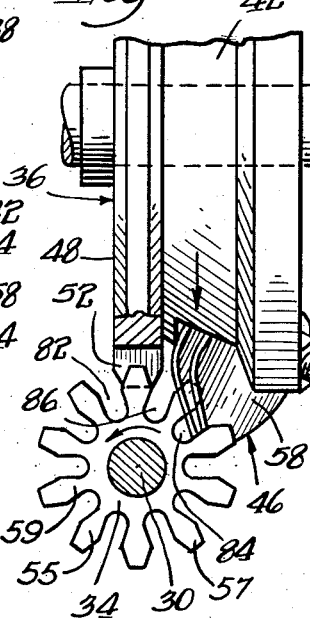
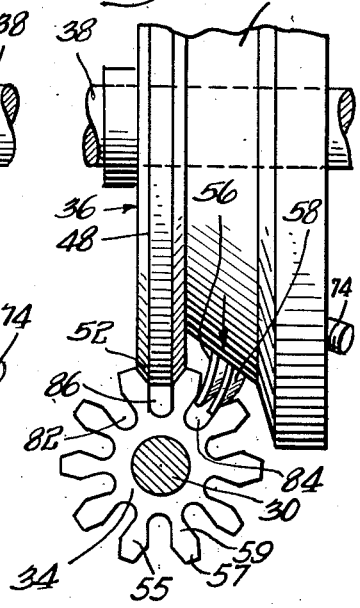
INVENTOR.
Oscar J. Holmes
BY:
Olson & Trexler
attys.

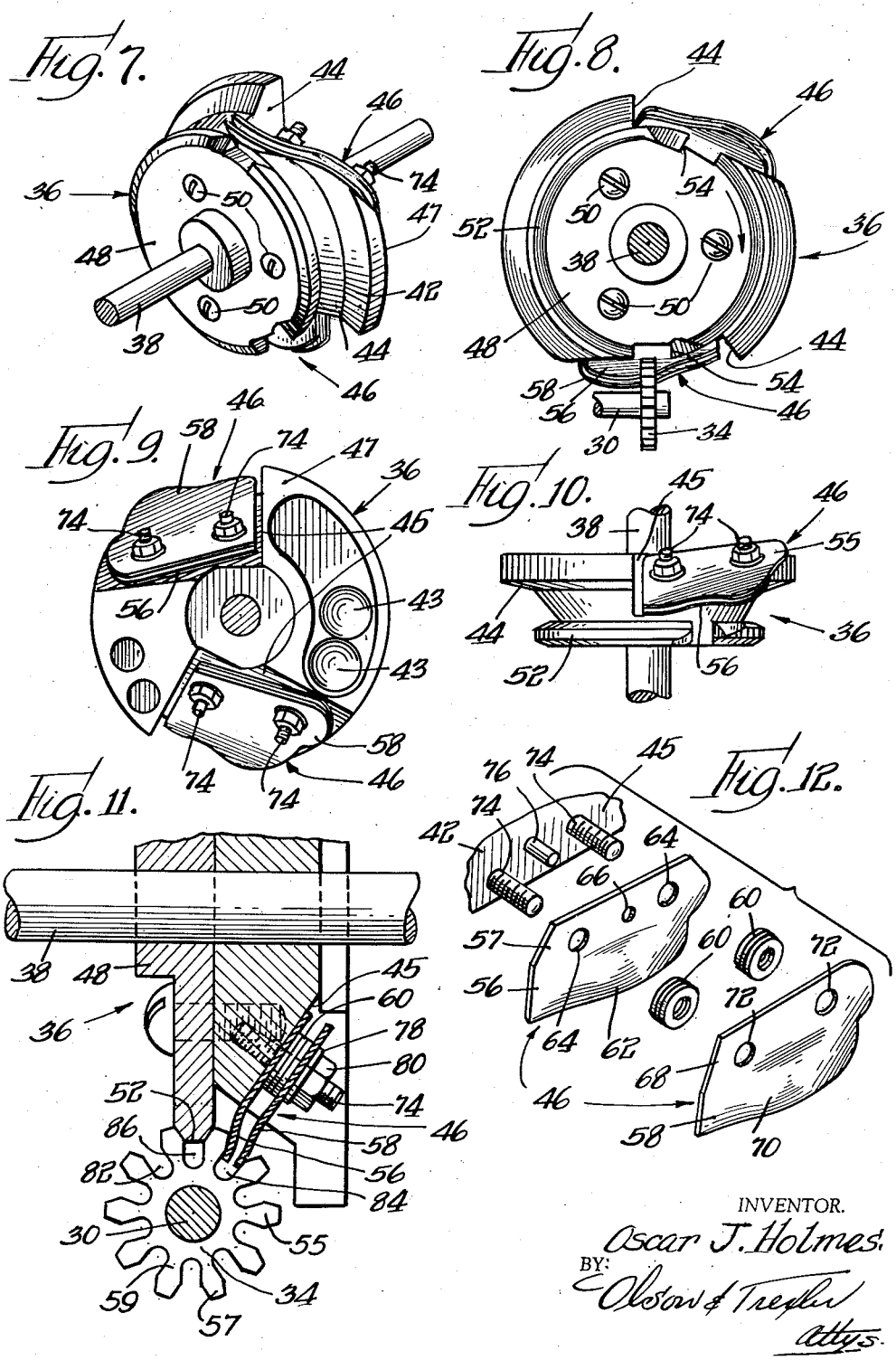

United States Patent Office 2,968,966
Patented Jan. 24, 1961

2,968,966

INTERMITTENT MOTION DEVICE FOR PROJECTORS

Oscar J. Holmes, 512 N. Belden Ave., Chicago 14, Ill.

Filed June 24, 1958, Ser. No. 744,273

4 Claims. (Cl. 74—426)

This invention relates to an improvement in an apparatus for imparting intermittent motion to motion picture film, and more particularly to an improved cam forming a part of said apparatus.

This invention represents an improvement over my prior Patent No. 2,797,612, issued July 2, 1957. The apapratus in the aforementioned patent is generally satisfactory, but certain parts thereof, especially the cams, are expensive to produce, and tend to wear quickly.

One of the objects of the herein disclosed invention is to provide an improved cam for an intermittent motion picture film feed apparatus, which cam does not wear quickly.

Another object of the herein disclosed invention is to provide an improved cam for an intermittent motion picture film feed apparatus, which cam allows little or no backlash during its operation.

A further object of the herein disclosed invention is to provide an improved cam for an intermittent motion picture film feed apparatus which cam may be produced easily and economically.

Other objects and advantages of the instant invention will become apparent to those skilled in the art from the following description in light of the acompanying drawings, in which:

Fig. 3 is a cross sectional view taken on line 3—3 in Fig. 2;

Fig. 4 is an end view taken along the line 4—4 in Fig. 2 showing a cam, embodying the herein disclosed invention, entering a gear;

Fig. 5 is similar to Fig. 4 but showing the cam driving the gear;

Fig. 6 is similar to Fig. 4 but showing the cam leaving the gear;

Fig. 7 is a perspective view of a cam mounting member having two cams embodying the present invention attached thereto;

Fig. 8 is an end elevation of the cam mounting member shown in Fig. 7 with one of the cams meshing with a gear;

Fig. 9 is an end elevation of the opposite side of the cam member shown in Fig. 7;

Fig. 10 is a plan view of the cam member shown in Fig. 7;

Fig. 11 is an axial sectional view of the cam mounting member as shown in Fig. 6; and Fig. 12 is an exploded view of a cam embodying the herein disclosed invention.

Figure 1:
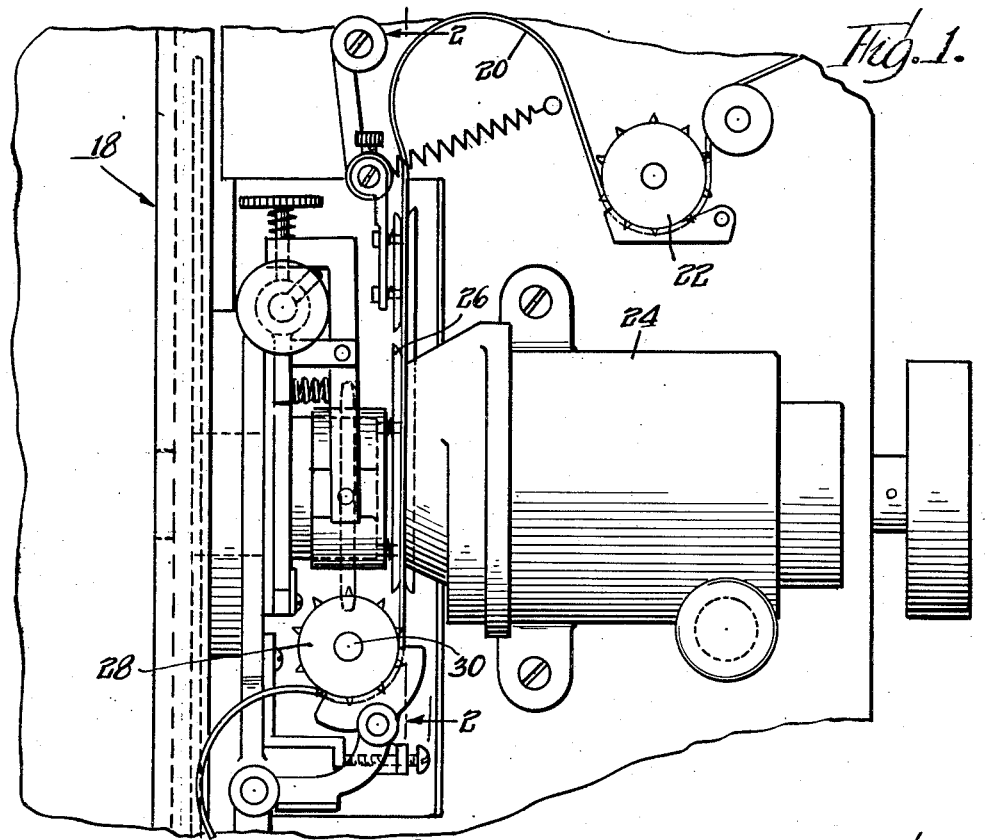
Fig. 1 is a side view of a portion of a motion picture projector including a cam embodying the instant invention.
Figure 2:
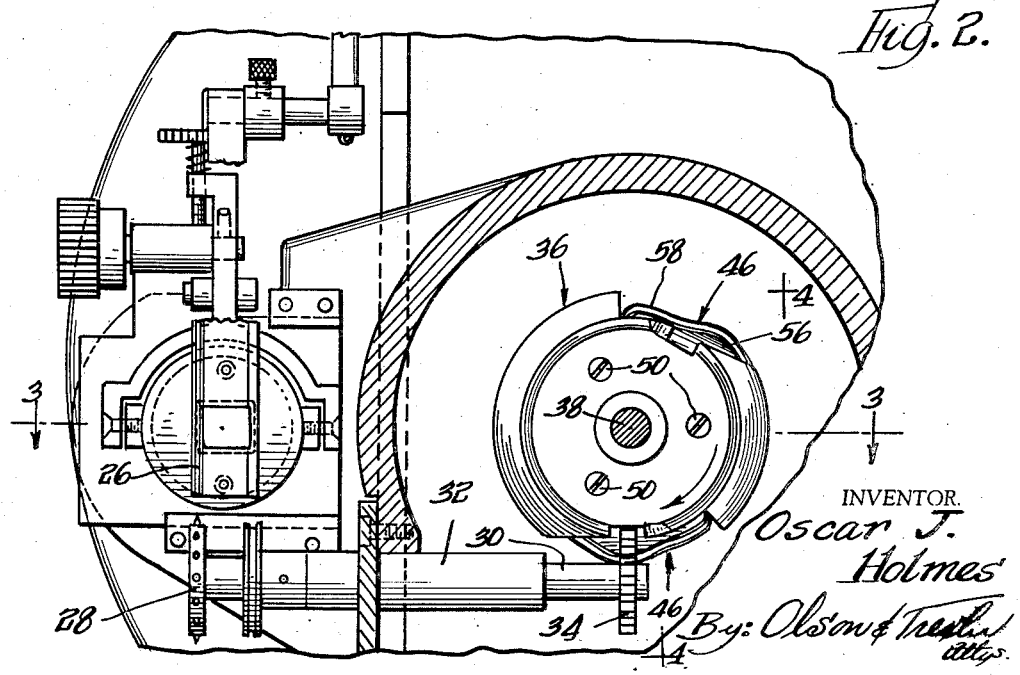
Fig. 2 is a cross sectional view of a portion of a motion picture projector taken on line 2—2 in Fig. 1.

Referring now to the drawings, and more particularly to Fig. 1, a portion of a motion picture projector 18 is shown therein. The motion picture projector 18 is adapted to move a film strip 20 intermittently therethrough and to project a light intermittently through said film strip while said strip is stationary. The film strip is threaded through a feed sprocket 22 and between a lens mount 24 and a pressure plate 26. An intermittently moving sprocket 28, which is mounted on a sprocket shaft 30 as may be seen in Fig. 2, draws the film strip between the lens mount and the pressure plate. The sprocket shaft is rotatably mounted in a shaft housing 32, which is attached to a portion of the projector's frame. A drive gear 34 is fixed to the other end of shaft 30 as may be seen in Figs. 2 and 8. Said drive gear provides the means for driving sprocket 28, which moves the film as described above.

Drive gear 34 is controlled by a cam member, generally indicated by numeral 36 having a pair of cams thereon. The cam member is fixed on a power shaft 38 driven by an electric motor (not shown) and constantly rotating when the projector is in operation. Said cam member and the cams thereon engage the drive gear 34 for intermittently rotating said drive gear 34.

Referring now to Fig. 3, it may be seen that a shutter 40 is fixed to shaft 38. The shutter regulates the light projected through the film and through the lens mount 24 in that it selectively interrupts the beam of light from a light source. Mounting of the shutter 40 on the same shaft 38 controlling movement of the sprocket 28 insures synchronization of the film and shutter.

The aforementioned cam member 36 includes an annular body 42 which has a plurality of holes 43 formed therein to balance the body. The body has a pair of cam recesses 44 on the periphery thereof providing a pair of oblique cam mounting surfaces 45. The cam mounting surfaces 45 are oblique in a compound manner. They are oblique relative to a plane along the back edge or surface 47, and are further oblique in that the leading edges start out at such plane while the remaining portions of the mounting surfaces progressively retreat therefrom axially of the cam member. The cam is intended for use in a motion picture projector for television broadcasting. Hence, as explained in my prior Patent 2,797,612, the cam mounting surfaces are spaced 144° and 216° to accommodate the 24 frame per second 16 mm. film projection rate to the 60 field per second television rate. A pair of cams 46, embodying the instant invention, are respectively fixed in each of said recesses. A disk 48 is fixed to the mount 42 by a plurality of screws 50 as may be seen in Figs. 7, 8, and 11. The holding disk 48 includes a discontinuous peripheral rim 52 engaging the gear 34 and having two openings or discontinuities 54 therein adjacent the recesses 44.

As shown in Figs. 4 to 6 and 11, the gear 34 defines a circumferential series of rather long teeth 55, each of which has an addendum 57 tapered radially outward and a rather extensive dedendum 59 tapered radially inward to provide a substantial space between adjacent teeth addenda 57. The peripheral rim 52 of the disk 48 and teeth addenda 57 are shaped in relation to each other to effect rather large area surface engagements of opposite sides of the rim with the addenda of two adjacent teeth 55 upon movement of the rim between the teeth as shown in Figs. 6 and 11. It will be noted that the rim 52 does not contract the teeth dedenda 59.

As may be seen in Figs. 11 and 12, each cam 46 includes a resilient camming plate 56, and a resilient retaining plate 58 spaced from the plate 56 by two sets of space washers 60. The plate 56 comprises a substantially flat mounting portion 57 and a slightly curved camming portion 62. Mounting portion 57 has a pair of mounting holes 64 and a positioning hole 66 intermediate the mounting holes. The resilient retaining plate 58 includes a substantially flat mounting portion 68 and a slightly curved retaining portion 70, and has a pair of mounting holes 72 extending through the mounting portion 68. The mounting holes 72 are registerable with the mounting holes 64 in plate 56.

The plates 56 and 58 are mounted on two pairs of threaded studs 74, respectively, projecting from the mounting surfaces 45. Each of the studs 74 extends through the respective mounting holes 64 and 72, and three washers 60, which provide spacing means, are mounted thereon to space plate 58 from plate 56. A positioning pin 76 is fixed between the mounting studs 74 and extends through each of the positioning holes 66 in the respective plates 56. Each plate 58 abuts the end of the respective pins 76 to insure the proper spacing of plate 58 from plate 56. A washer 78 is mounted on each stud 74 and a nut 80 is threaded on each of the studs 72 releasably to attach the plates 56 and 58 to mount 42.

Both of the plates 56 and 58 preferably are made from a high carbon spring steel and are stamped by dies to the proper form and configuration, thus, the cost of manufacture of the plates is quite nominal. After the plates are stamped, they are heat treated to bring out the desired resilience and hardness of the plates.

In the operation of the projector, the motor (not shown) drives shaft 38, which, in turn, drives shutter 40 and cam member 36. Cam member 36 carries a pair of cams 46, as described above, which cams engage drive gear 34. As the cams engage the drive gear and rotate said drive gear, which, in turn, rotates the shaft 30, shaft 30 rotates the intermittently moving sprocket 28 to pull film 20 past the lens mount. As was pointed out above, the shutter 40 interrupts the light passing through the film so that the light beam is interrupted as the film is moved or pulled down.

It may be seen that rim 52 normally enters a space 82 between a pair of teeth 55 on drive gear 34 to engage the addenda 57 on the adjacent teeth and hold the drive gear in fixed position. A cam 46 is shown in Fig. 4 as it enters a space 84, the leading portion of the cam being aligned with a space 84 displaced by two teeth from the space 84 receiving the rim 52. It should be noted that the gear engaging portions of the plates necessarily are spaced closer together at the forward edge of cam 46 than at intermediate portions thereof inasmuch as the cam enters space 84 at an angle. As cam 46 enters space 84, the corresponding opening or discontinuity 54 in the rim is aligned with the space 82. When opening 54 is aligned with space 82, camming portion 62 of resilient plate 56 engages an adjacent tooth to rotate the drive gear in a counter-clockwise direction as is shown in Fig. 5. As may be seen in Fig. 11, retaining portion 70 of resilient plate 58 simultaneously engages the adjacent tooth to prevent backlash. As the cam rotates, it rotates drive gear 34 so that a space 86 between the spaces 82 and 84 is positioned in alignment with the rim 52. Further rotation of cam positions rim 52 in space 86 as cam 46 leaves space 84. Thus, the gear 34 is again securely held in fixed position.

The outer edges of the leading portions of the cams are positioned radially farther out than the outer edges of the trailing portions in order to project the same distance into the gear or star wheel, even though the mounting surfaces of the leading portions are spaced farther from the gear or star wheel than are the corresponding trailing portions. The cam shape is such that the initial and final movements of the cam through the star wheel are substantially parallel to the axis of the star wheel, movement of the intermediate portion being oblique. Thus, the star wheel is first held substantially still, as received from the rim 52, then moved rapidly, and again held substantially still for receipt on the rim 52 following the discontinuity therein.

Plates 56 and 58 engage the teeth of gear 34 sufficiently close that even with normal wear the resilience of the plates insures that the plates will continue to be operative without backlash.

Moreover, as shown in Figs. 4 to 6, each pair of opposed cam plates 56 and 58, shaped in the manner described, is dimensioned and mounted on the body 42 so that the cam plates upon entering the space between two adjacent teeth 55 engage only the dedenda 59 of the teeth without contacting the addenda 57.

It is evident that the herein disclosed cam is particularly adaptable to mass production methods. The plates are readily stamped out and may be heat treated in a batch and are easily applied to the cam member 36. The studs, washers, and nuts are items which are readily available in the open market. Thus, the cost of producing the cam is held to a minimum.

While a specific embodiment of the invention has been shown and described, it is evident that numerous variations and modifications may be made without departing from the spirit and scope of invention as expressed in the appended claims.

The invention is claimed as follows:

1. In a motion picture machine, the combination of film moving and locating means including an operating gear therefor having a plurality of rotatably spaced film exposing positions, said gear having teeth equal in number to said positions and having addenda and dedenda of substantial depth, a rotary holding element having a periphery normally entering between and engaging only the addenda of two adjacent teeth of said gear to hold the latter precisely in one of said positions thereof, said periphery defining a discontinuity therein, a rotary indexing element, a pair of sheet metal cam elements of approximately equal strength detachably mounted on said indexing element and projecting therefrom in spaced relation to each other, said cam elements having projecting gear-engaging free edge portions and being shaped and being positioned on and by said indexing element to move the projecting edge portions of both cam elements between two adjacent gear teeth to engage only the dedenda thereof upon rotation of the indexing element, said projecting edge portions having circumferentially spaced leading and trailing ends shaped to have a substantially parallel relation to the axis of said gear when engaged therewith, said leading and trailing ends being offset from each other with respect to said gear to a degree equal to the spacing of said gear teeth, said projecting edge portions curving longitudinally of the axis of said operating gear between and merging smoothly with said ends thereof and having a minimum spacing from said holding element periphery equal to at least one gear tooth space, and means for rotating said holding element and said indexing element in synchronization to move said periphery discontinuity into alignment with said gear concurrently with engagement of said gear by said cam elements.

2. In a motion picture machine, the combination of film moving and locating means including an operating gear therefor having a plurality of rotatably spaced film exposing positions, said gear having teeth equal in number to said positions and having addenda and dedenda of substantial depth, a rotary holding element having a periphery normally entering between and engaging only the addenda of two adjacent teeth of said gear to hold the latter precisely in one of said positions thereof, said periphery defining a discontinuity therein, a rotary indexing element, a pair of sheet metal cam elements mounted on said indexing element and projecting therefrom in spaced relation to each other, said cam elements having projecting gear-engaging free edge portions and being shaped and being positioned on and by said indexing element to move the projecting edge portions of both cam elements between two adjacent gear teeth to engage only the dedenda thereof upon rotation of the indexing element, said projecting edge portions having circumferentially spaced leading and trailing ends offset from each other with respect to said gear to a degree equal to the spacing of adjacent teeth of said gear, said projecting edge portions curving longitudinally of the axis of said operating gear between said ends thereof and having a minimum spacing from said periphery equal to at least one gear tooth space, and means for rotating said holding element and said indexing element in synchronization to move said periphery discontinuity into alignment with said gear concurrently with engagement of said gear by said cam elements.

3. In a motion picture machine, the combination of film moving and locating means including an operating gear therefor having a plurality of rotatably spaced film exposing positions, said gear having teeth equal in number to said positions, a rotary holding element having a periphery normally entering between and engaging two adjacent teeth of said gear to hold the latter precisely in one of said positions thereof, said periphery defining a gap therein, a rotary indexing element, a pair of flexible cam plates mounted on said indexing element and projecting therefrom in spaced relation to each other, said cam plates having projecting gear-engaging free edge portions and being shaped and being positioned on and by said indexing element to move the projecting edge portions of both cam plates between and into engagement with two adjacent teeth upon rotation of the indexing element, said projecting edge portions having circumferentially spaced leading and trailing ends offset from each other with respect to said gear to a degree equal to the spacing of adjacent teeth of said gear, said projecting edge portions curving longitudinally of the axis of said operating gear between said ends thereof, and means for rotating said holding element and said indexing element in synchronization to move said periphery gap into alignment with said gear concurrently with engagement of said gear by said cam plates.

4. In a motion picture machine, the combination of film moving and locating means including an operating gear therefor having a plurality of rotatably spaced film exposing positions, said gear having teeth equal in number to said positions and defining opposing holding surfaces and opposing indexing surfaces spaced from a rotary holding element having a periphery normally entering between and engaging only the opposing holding surfaces of two adjacent teeth of said gear to hold the latter precisely in one of said positions thereof, said periphery defining a discontinuity therein, a rotary indexing element, a pair of cam plates mounted on said indexing element and projecting therefrom in spaced relation to each other, said cam plates having projecting gear-engaging free edge portions and being shaped and being positioned on and by said indexing element to move the projecting edge portions of both cam plates between two adjacent teeth to engage only the opposing indexing surfaces thereof upon rotation of indexing element, said projecting edge portions having circumferentially spaced leading and trailing ends shaped to have a substantially parallel relation to the axis of said gear when engaged therewith, said leading and trailing ends being offset from each other with respect to said gear to a degree equal to the spacing of said gear teeth, said projecting edge portions curving longitudinally of the axis of said operating gear between said ends thereof, and means for rotating said holding element and said indexing element in synchronization to move said periphery discontinuity into alignment with said gear concurrently with engagement of said gear by said cam elements.

References Cited in the file of this patent

UNITED STATES PATENTS

| 655,535 | Wells et al. | Aug. 7, 1900 |
| 2,117,806 | Holmes | May 17, 1938 |
| 2,335,504 | Gazda | Nov. 30, 1943 |
| 2,572,334 | Guibert | Oct. 23, 1951 |
| 2,596,581 | Mercier | May 13, 1952 |
| 2,797,612 | Holmes | July 2, 1957 |

FOREIGN PATENTS

| 699,318 | France | Dec. 9, 1930 |